(12) United States Patent
Chandwani et al.

(10) Patent No.: US 9,397,849 B2
(45) Date of Patent: Jul. 19, 2016

(54) STATISTICAL MULTIPLEXING OF MULTIPLE RADIO BEARERS TO CONSERVE RADIO RESOURCES

(71) Applicant: Verizon Patent and Licensing Inc., Arlington, VA (US)

(72) Inventors: Rakesh Chandwani, Freehold, NJ (US); Lalit R. Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 14/452,963

(22) Filed: Aug. 6, 2014

(65) Prior Publication Data

US 2016/0043879 A1 Feb. 11, 2016

(51) Int. Cl.
*H04L 12/28* (2006.01)
*H04L 12/56* (2006.01)
*H04L 12/18* (2006.01)
*H04W 72/00* (2009.01)

(52) U.S. Cl.
CPC ........... *H04L 12/189* (2013.01); *H04W 72/005* (2013.01)

(58) Field of Classification Search
CPC .................................................. H04W 72/005
USPC .................................. 370/312, 390, 532–539
See application file for complete search history.

(56) References Cited

U.S. PATENT DOCUMENTS

| | | | |
|---|---|---|---|
| 2008/0212583 A1* | 9/2008 | Rey ..................... | H04L 12/1836 370/390 |
| 2009/0168793 A1* | 7/2009 | Fox ..................... | H04L 12/5693 370/412 |
| 2010/0110989 A1* | 5/2010 | Wu ........................ | H04L 47/10 370/328 |
| 2012/0170501 A1* | 7/2012 | Drozt .................. | H04W 72/005 370/312 |
| 2012/0218892 A1* | 8/2012 | Kotecha ................. | H04L 47/14 370/235 |
| 2015/0055544 A1* | 2/2015 | Lee ........................ | H04W 4/06 370/312 |

* cited by examiner

*Primary Examiner* — Chuong T Ho

(57) ABSTRACT

A device may receive bearer information associated with radio bearers to be multiplexed to form a master bearer. The device may determine respective bandwidth amounts, for each radio bearer, to be allocated to the master bearer. The device may determine a total bandwidth to be allocated to the master bearer based on the bandwidth amounts. The device may form the master bearer, having the total bandwidth, based on multiplexing the radio bearers. The device may provide respective content streams, associated with the radio bearers, via the master bearer.

20 Claims, 9 Drawing Sheets

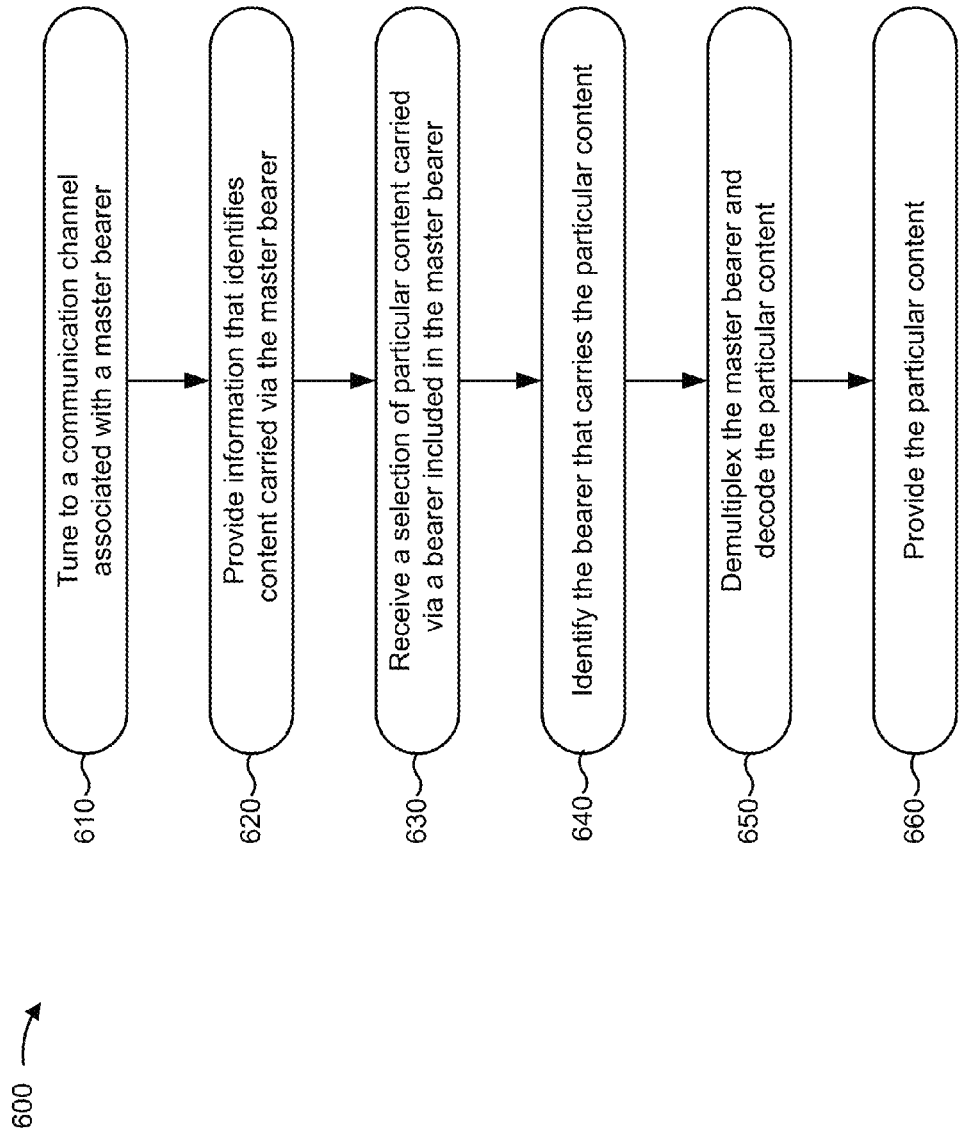

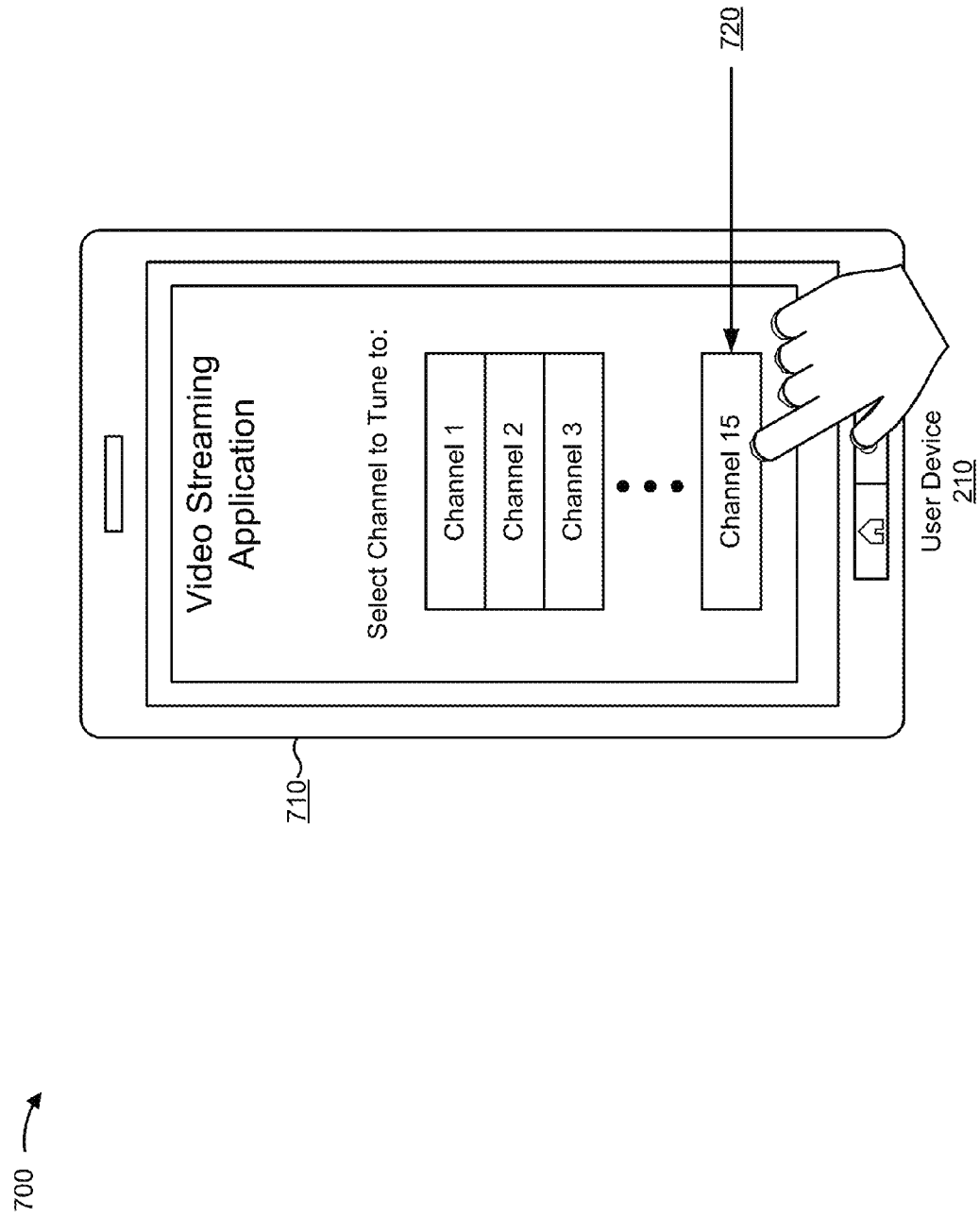

STATISTICAL MULTIPLEXING OF MULTIPLE RADIO BEARERS TO CONSERVE RADIO RESOURCES

BACKGROUND

Multimedia Broadcast Multicast Services (MBMS) may refer to a point-to-multipoint interface specification for third generation partnership project (3GPP) cellular networks. MBMS is designed to provide efficient delivery of broadcast and multicast services, both within a cell as well as within the core network. MBMS may use radio bearers to provision radio resources for communications between two points.

BRIEF DESCRIPTION OF THE DRAWINGS

FIG. 6 is a flow chart of an example process for demultiplexing a master bearer and decoding content carried by a bearer included in the master bearer; and FIGS. 7A and 7B are diagrams of an example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

In a radio access network, a radio bearer may carry network traffic with a variable bitrate (e.g., video traffic, audio traffic, etc.). However, the radio bearer may be provisioned with a fixed bandwidth, which may allocate a particular amount of radio resources to process the network traffic. For example, a radio bearer may be provisioned based on the peak bitrate of the network traffic to ensure a high quality user experience. However, when the network traffic is below the peak bitrate, the additional bandwidth provisioned for the radio bearer is wasted (e.g., cannot be allocated to other network traffic). Implementations described herein assist in multiplexing multiple bearers to form a master bearer with a bandwidth that is less than the sum of the peak bitrates for each of the multiplexed bearers. In this way, the master bearer may conserve radio resources by more efficiently allocating bandwidth to radio bearers.

Figure 1:
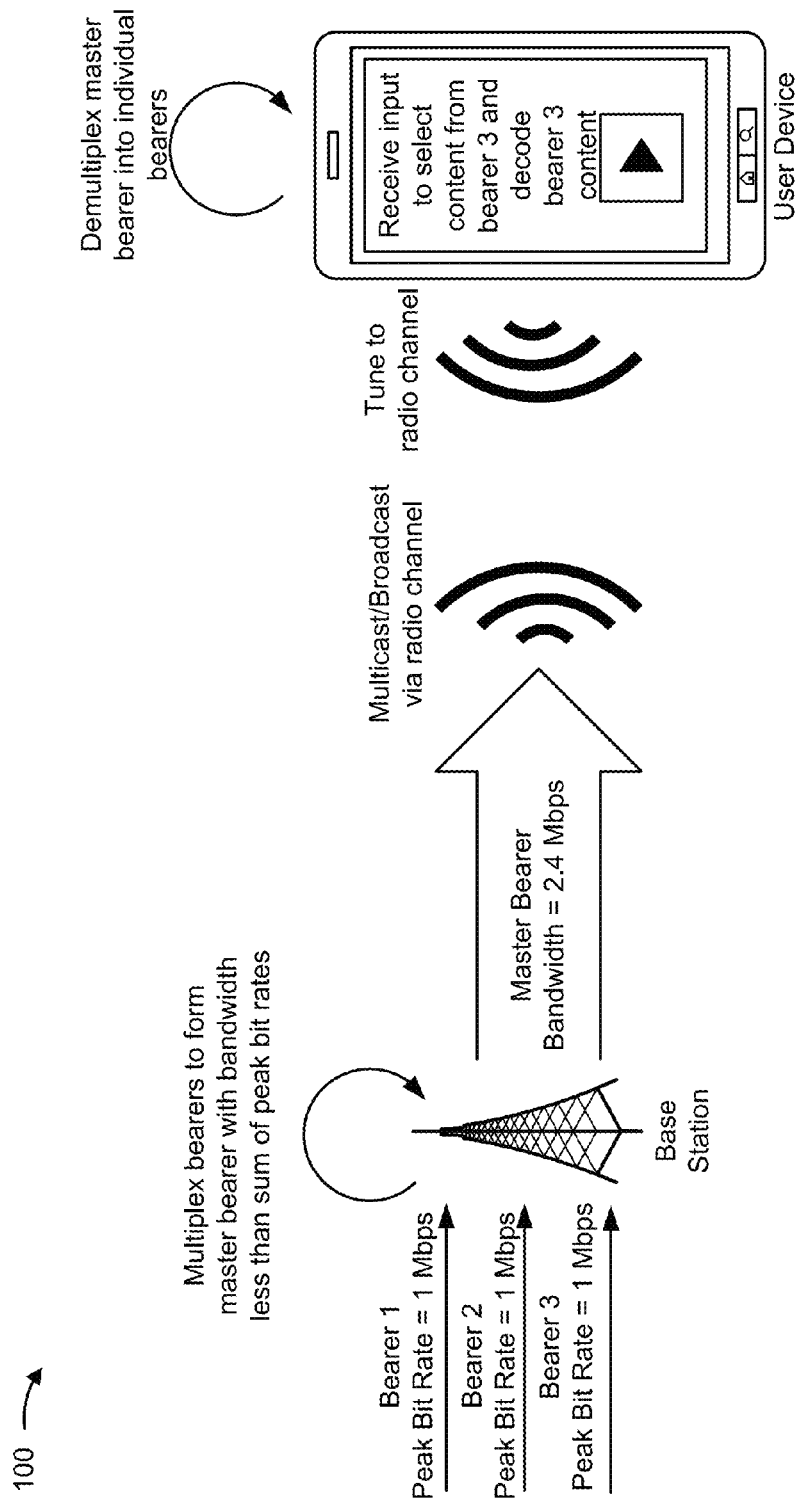
FIG. 1 is a diagram of an overview of an example implementation described herein.

FIG. 1 is a diagram of an overview of an example implementation 100 described herein. As shown in FIG. 1, assume that a base station (e.g., associated with a cellular network) receives information that identifies three bearers, and information that identifies a peak bitrate of each of the bearers. For example, assume that Bearer 1 has a peak bitrate of 1 megabit per second (Mbps), that Bearer 2 has a peak bitrate of 1 Mbps, and that Bearer 3 has a peak bitrate of 1 Mbps, as shown.

As further shown in FIG. 1, assume that the base station multiplexes these three bearers to form a master bearer with a bandwidth that is less than the sum of the peak bitrates of the multiplexed bearers. For example, the sum of the peak bitrates for Bearer 1, Bearer 2, and Bearer 3 is 3 Mbps. As shown, assume that the master bearer is created with a bandwidth of 2.4 Mbps. The amount of bandwidth to be allocated to the master bearer may be determined using one or more statistical techniques, as described in more detail elsewhere herein. In a simple case, the base station may allocate, to the master bearer, an amount of bandwidth equal to the sum of the average bitrates for the three bearers.

As further shown in FIG. 1, assume that the base station multicasts or broadcasts the master bearer via a radio channel. As shown, assume that a user device (e.g., a smart phone, a tablet computer, etc.) tunes to the radio channel and receives input to select content from a particular bearer included in the master bearer, such as Bearer 3. Assume that the user device demultiplexes the master bearer into the individual bearers, decodes content carried by Bearer 3, and provides the content carried by Bearer 3 (e.g., via the master bearer). In this way, the base station may conserve radio resources by allocating a smaller amount of bandwidth for the master bearer than would otherwise be required if each bearer were individually allocated an amount of bandwidth equal to the peak bitrate of the bearer.

Figure 2:
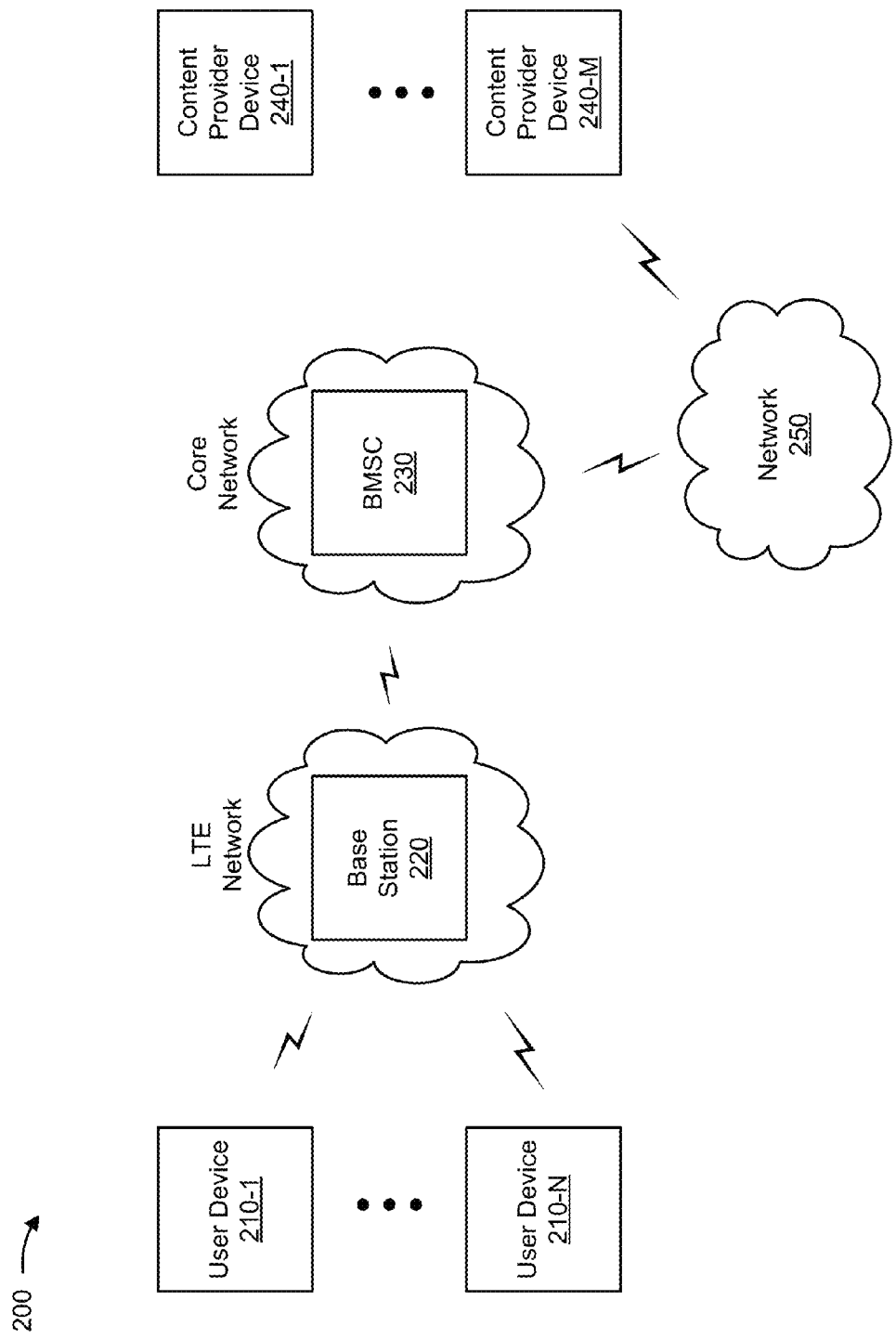
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210-1 through 210-N (N≥1) (hereinafter referred to collectively as "user devices 210," and individually as "user device 210"), a base station 220, a broadcast multicast switching center device (BMSC) 230, a set of content provider devices 240-1 through 240-M (M≥1) (hereinafter referred to collectively as "content provider devices 240," and individually as "content provider device 240"), and a network 250. Devices of environment 200 may interconnect via wired connections, wireless connections, or a combination of wired and wireless connections.

User device 210 may include a device capable of receiving, generating, storing, processing, and/or providing information via a network. For example, user device 210 may include a communications and/or computing device, such as a mobile phone (e.g., a smart phone, a radiotelephone, etc.), a laptop computer, a tablet computer, a handheld computer, a gaming device, or a similar device. In some implementations, user device 210 may receive information from and/or transmit information to another device in environment 200 (e.g., via base station 220). For example, user device 210 may receive content via a master bearer transmitted by base station 220, may decode a portion of the content, and may provide the decoded portion (e.g., for output via a display, a speaker, etc.).

Base station 220 may include one or more devices capable of transferring traffic, such as audio, video, text, and/or other traffic, destined for and/or received from user device 210. In some implementations, base station 220 may include an evolved node B (eNB) associated with a long term evolution (LTE) network that receives traffic from and/or sends traffic to network 250 (e.g., via BMSC 230, via a serving gateway, via a packet data network gateway, etc.). Additionally, or alternatively, one or more base stations 220 may be associated with a radio access network (RAN) that is not an LTE network (e.g., a third generation (3G) network). Base station 220 may send traffic to and/or receive traffic from user device 210 via an air interface. In some implementations, base station 220 may multiplex multiple bearers to form a master bearer, and may transmit content over the master bearer (e.g., via an air interface).

BMSC 230 may include one or more devices capable of receiving, generating, storing, processing, and/or providing information associated with providing a broadcast or multicast service. For example, BMSC 230 may include a server device, a traffic transfer device (e.g., a router, a switch, a hub, etc.), or a similar device. In some implementations, BMSC 230 may allocate bandwidth for providing a broadcast or a multicast service, and/or may instruct other devices associated with providing the broadcast or multicast service. For example, BMSC 230 may provide information to base station 220 to assist base station 220 in multiplexing multiple bearers, associated with the broadcast or multicast, to form a master bearer. In some implementations, BMSC 230 may be located within a core network of a service provider (e.g., a service provider that providers RAN services).

Content provider device 240 may include one or more devices capable of receiving, generating, storing, processing, and/or providing content (e.g., audio content, video content, etc.). For example, content provider device 240 may include a storage device, a server device (e.g., a host server, a web server, an HTTP server, a content server, etc.), or a similar device. In some implementations, content provider device 240 may provide content (e.g., live content, prerecorded content, etc.), and may provide information associated with the content to BMSC 230. BMSC 230 may use this information to instruct base station 220 regarding a manner in which to multiplex multiple bearers (e.g., associated with different content streams) to form a master bearer.

Network 250 may include one or more wired and/or wireless networks. For example, network 250 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
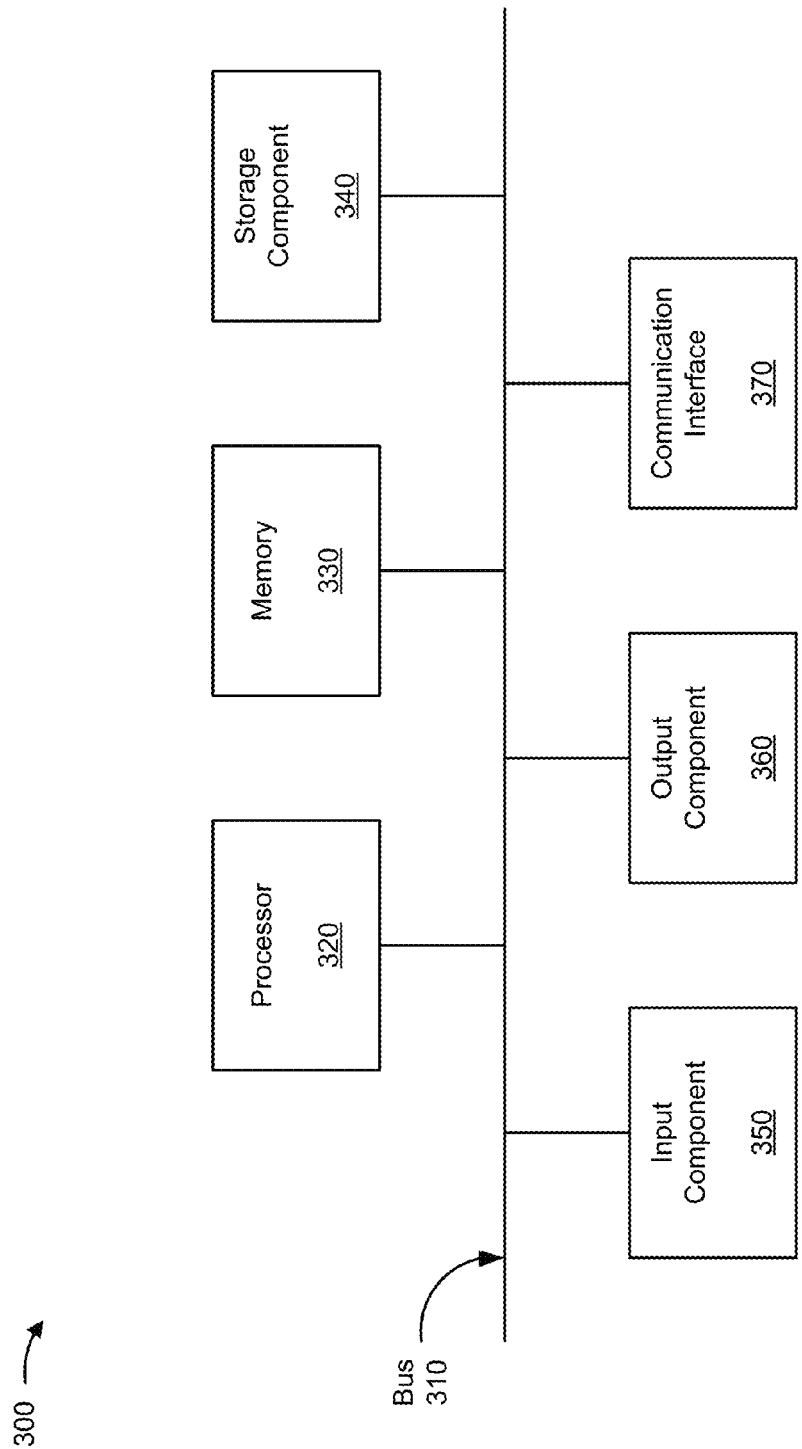
FIG. 3 is a diagram of example components of one or more devices of FIG. 2.

FIG. 3 is a diagram of example components of a device 300. Device 300 may correspond to user device 210, base station 220, BMSC 230, and/or content provider device 240. In some implementations, user device 210, base station 220, BMSC 230, and/or content provider device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
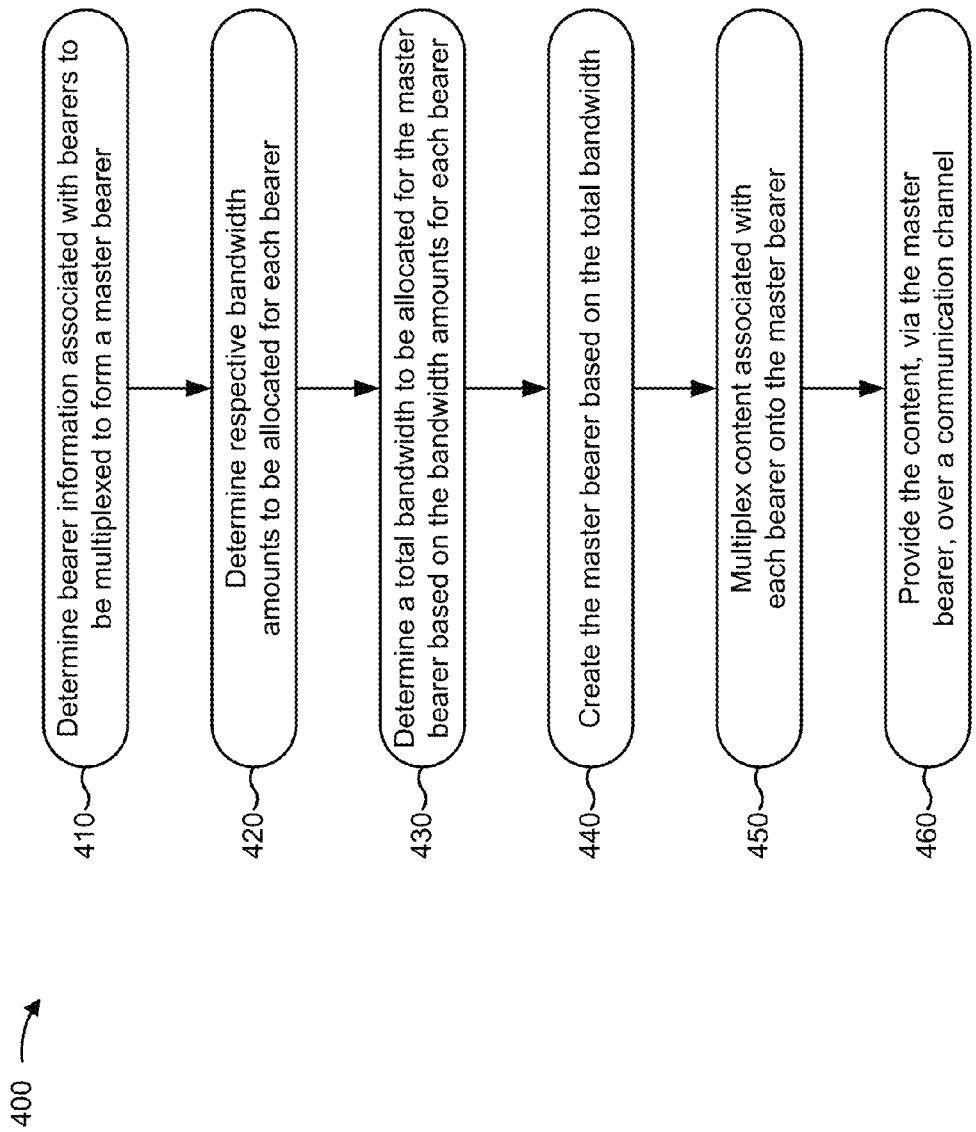
FIG. 4 is a flow chart of an example process for multiplexing multiple radio bearers to form a master bearer.

FIG. 4 is a flow chart of an example process 400 for multiplexing multiple radio bearers to form a master bearer. In some implementations, one or more process blocks of FIG. 4 may be performed by base station 220. Additionally, or alternatively, one or more process blocks of FIG. 4 may be performed by another device or a group of devices separate from or including base station 220, such as user device 210, BMSC 230, and/or content provider device 240.

As shown in FIG. 4, process 400 may include determining bearer information associated with bearers to be multiplexed to form a master bearer (block 410). For example, base station 220 may determine bearer information associated with radio bearers to be multiplexed together to form a master bearer that includes each of the radio bearers. In some implementations, BMSC 230 may determine the bearer information, and may provide the bearer information to base station 220. Additionally, or alternatively, base station 220 may determine the bearer information (e.g., with or without information received from BMSC 230).

The bearer information may include, for example, a quantity of bearers to be multiplexed together to form a master bearer, a bearer identifier used to identify a bearer, a content type of content to be carried via the bearer, a content identifier that identifies content to be carried via the bearer, a time period that indicates when the bearer is to be provisioned to provide the content, a quality of service parameter associated with the bearer, etc.

The bearer information may include bitrate information associated with a bearer, in some implementations. For example, bitrate information may include information that identifies a peak (e.g., a maximum) bitrate associated with a bearer and/or a content stream carried via the bearer, information that identifies an average bitrate associated with a bearer and/or a content stream carried via the bearer, information that identifies a minimum bitrate associated with a bearer and/or a content stream carried via the bearer, etc. Base station 220 may use this bitrate information to determine a bandwidth to be allocated to a master bearer.

As further shown in FIG. 4, process 400 may include determining respective bandwidth amounts to be allocated for each bearer (block 420). For example, base station 220 may determine, based on bearer information and/or bitrate information associated with the bearers, respective bandwidth amounts to be allocated for each bearer, to form the master bearer (e.g., may determine a guaranteed bitrate to reserve for each bearer).

In some implementations, base station 220 may determine to allocate, for a bearer, an amount of bandwidth that is less than a peak bitrate associated with content carried via the bearer. For example, base station 220 may determine to allocate an amount of bandwidth equal to the average bitrate of the content carried via the bearer. As another example, base station 220 may determine to allocate an amount of bandwidth equal to a particular bitrate that is between the average bitrate and the peak bitrate (e.g., halfway between the average bitrate and the peak bitrate, 75% above the average bitrate and 25% below the peak bitrate, 25% above the average bitrate and 75% below the peak bitrate, etc.). In some implementations, base station 220 may determine to allocate an amount of bandwidth that is a particular percentage of the peak bitrate (e.g., 90%, 80%, etc.). Additionally, or alternatively, base station 220 may determine to allocate an amount of bandwidth based on a ratio between the peak bitrate and the average bitrate (e.g., a peak to average ratio). As another example, base station 220 may determine to allocate an amount of bandwidth based on a quantity of times that a content stream reaches a peak bitrate and/or reaches a minimum bitrate.

Base station 220 may determine to allocate, for a bearer, an amount of bandwidth based on a bitrate variation associated with content carried via the bearer, in some implementations (e.g., a video stream with a relatively high amount of movement, between different frames of the video stream, as compared to other video streams). Additionally, or alternatively, base station 220 may determine an amount of bandwidth to allocate to a bearer based on a content type of content carried via the bearer (e.g., audio content, video content, live content, prerecorded content, sports content, movie content, television content, etc.). In some implementations, base station 220 may configure the amount of bandwidth based on a time of day (e.g., a different bandwidth at different times of the day), a day of the week, a quantity of bearers being multiplexed, historic information (e.g., historic bearer information, historic bitrate information, historic performance information, etc., associated with a bearer), current network usage and/or conditions, predicted network usage and/or conditions, historic network usage and/or conditions, etc.

As further shown in FIG. 4, process 400 may include determining a total bandwidth to be allocated for the master bearer based on the bandwidth amounts for each bearer (block 430). For example, base station 220 may determine a total amount of bandwidth to allocate to the master bearer. In some implementations, base station 220 may determine the total bandwidth based on a quantity of bearers to be multiplexed to form the master bearer. Additionally, or alternatively, base station 220 may determine the total bandwidth based on bearer information and/or bitrate information associated with each bearer to be multiplexed to form the master bearer. In some implementations, base station 220 may sum each bandwidth amount, corresponding to each bearer to be multiplexed to form the master bearer, to determine the total bandwidth amount to be allocated to the master bearer.

The total bandwidth may be less than a sum of all of the peak bitrates for each bearer to be included in the master bearer, in some implementations. For example, base station 220 may sum the average bitrates for each bearer to determine the total bandwidth. Additionally, or alternatively, base station 220 may sum a bitrate between the average bitrate and the peak bitrate to determine the total bandwidth.

In some implementations, base station 220 may configure the amount of total bandwidth based on a time of day (e.g., a different bandwidth at different times of the day), a day of the week, a content type, a quantity of bearers being multiplexed (e.g., with a higher quantity of bearers forming a master bearer with a bandwidth that is closer to the sum of the average bandwidths, with a lower quantity of bearers forming a master bearer with a bandwidth that is closer to the sum of the peak bandwidths, etc.), historic information, current network usage (e.g., when the master bearer is formed), predicted network usage (e.g., at a time period when the master bearer is to be used to transmit content streams), historic network usage, etc.

As further shown in FIG. 4, process 400 may include creating the master bearer based on the total bandwidth (block 440). For example, base station 220 may create the master bearer, and may allocate the total bandwidth to the master bearer. Base station 220 may multiplex multiple individual bearers to form a master bearer with a total allocated bandwidth that is less than a sum of the peak bitrates of the individual bearers. In some implementations, base station 220 may associate a master bearer identifier with the master bearer, so that the master bearer can be identified (e.g., by base station 220, user device 210, etc.). Additionally, or alternatively, base station 220 may associate a bearer identifier with each individual bearer included in the master bearer, so that individual bearers can be identified to decode content carried by the individual bearers (e.g., by user device 210).

Base station 220 may create multiple master bearers, in some implementations. For example, base station 220 may multiplex a first set of bearers to form a first master bearer, may multiplex a second set of bearers to form a second master bearer, etc. In some implementations, the first set of bearers and the second set of bearers may be mutually exclusive. Alternatively, a particular bearer may be included in more than one set of bearers (e.g., may be included in more than one master bearer), in some implementations. In some implementations, bearers associated with a first content type may be multiplexed to form a first master bearer, and bearers associated with a second content type may be multiplexed to form a second master bearer. Additionally, or alternatively, bearers associated with a high bitrate variation (e.g., above a threshold) may be multiplexed to form a first master bearer, and bearers associated with a low bitrate variation (e.g., below a threshold) may be multiplexed to form a second master bearer.

As further shown in FIG. 4, process 400 may include multiplexing content associated with each bearer onto the master bearer (block 450), and providing the content, via the master bearer, over a communication channel (block 460). For example, base station 220 may receive content associated with each bearer, and may multiplex the content onto the master bearer. Base station 220 may then provide the content, via the master bearer, via a communication channel, such as a radio channel (e.g., via an air interface). For example, base station 220 may multicast the content via the master bearer by providing the content over a multicast traffic channel. Additionally, or alternatively, base station 220 may broadcast the content via the master bearer by providing the content over a broadcast traffic channel.

Base station 220 may associate each content stream (e.g., associated with an individual bearer) with an identifier, such as a bearer identifier or a content identifier, that differentiates a content stream from other content streams carried via the master bearer. In this way, user device 210, which may tune to a channel associated with the master bearer, may differentiate between different content streams carried via the master bearer. This may allow user device 210 to decode and output a particular content stream that is of interest to a user associated with user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
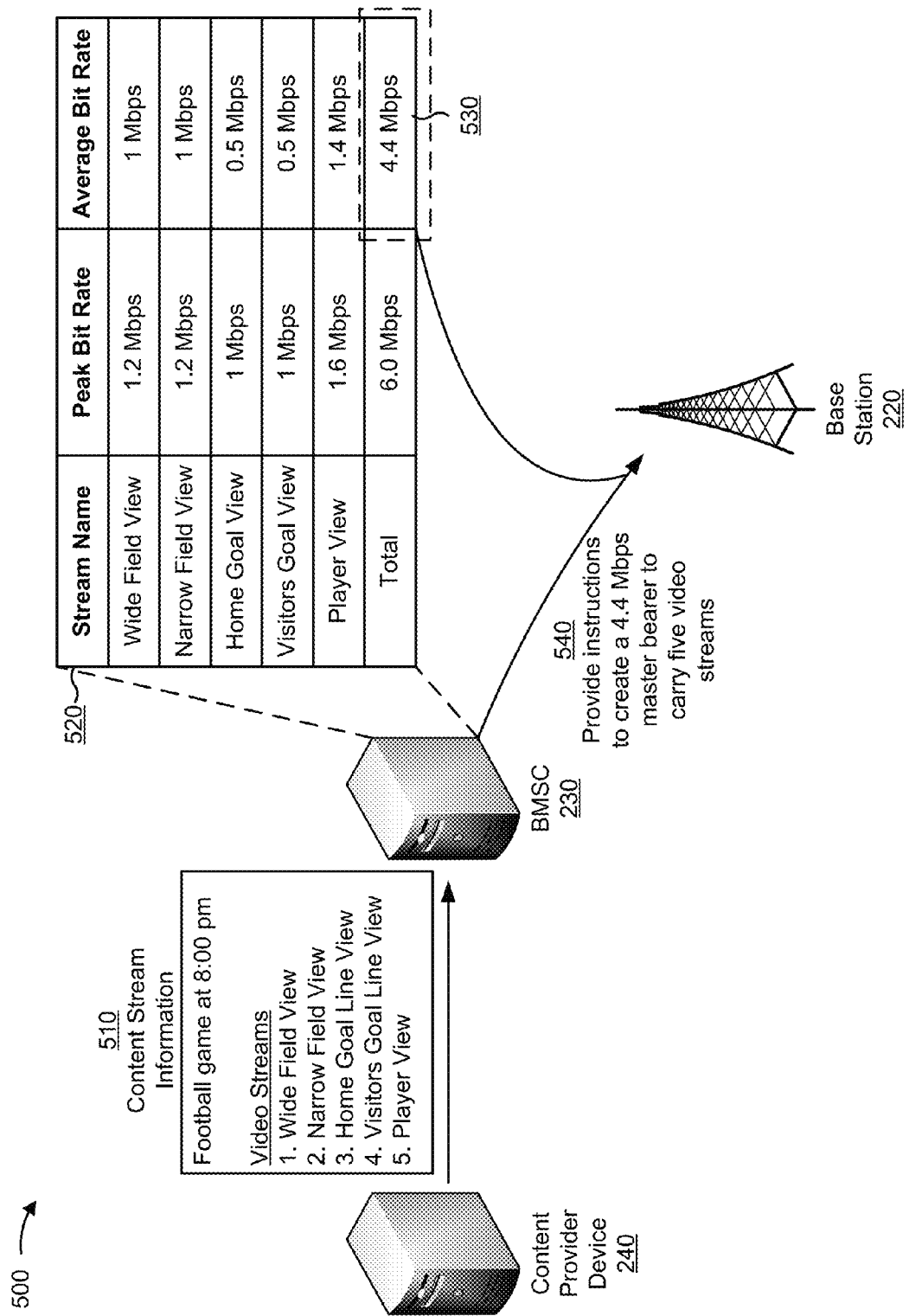
FIGS. 5A and 5B are diagrams of an example implementation relating to the example process shown in FIG. 4.
Figure 5B:
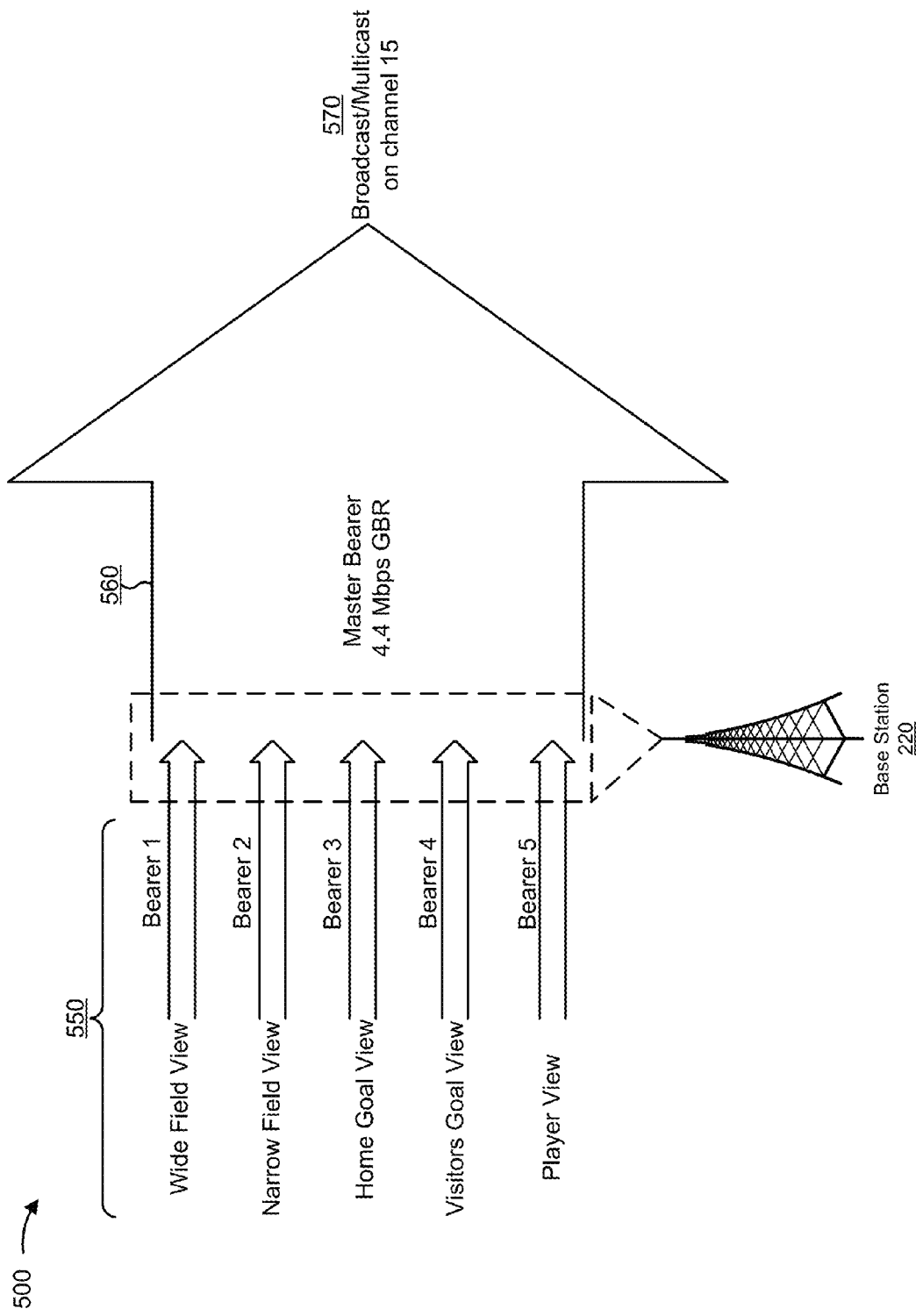

FIGS. 5A and 5B are diagrams of an example implementation 500 relating to example process 400 shown in FIG. 4. FIGS. 5A and 5B show an example of multiplexing multiple radio bearers to form a master bearer.

As shown in FIG. 5A, and by reference number 510, assume that content provider device 240 provides content stream information to BMSC 230. Assume that the content stream information indicates that a football game will be broadcast at 8:00 pm, and that the football broadcast includes five video streams. Assume that the five video streams are a wide field camera view, a narrow field camera view, a home goal line camera view, a visitors goal line camera view, and a player camera view.

As shown by reference number 520, assume that BMSC 230 determines bitrate information associated with each of the five video streams (e.g., based on information received from content provider device 240). For example, assume that BMSC 230 determines a peak bitrate and an average bitrate associated with each video stream. As shown, assume that BMSC 230 determines that the wide field view has a peak bitrate of 1.2 Mbps, the narrow field view has a peak bitrate of 1.2 Mbps, the home goal view has a peak bitrate of 1 Mbps, the visitors goal view has a peak bitrate of 1 Mbps, and the player view has a peak bitrate of 1.6 Mbps. As further shown, assume that BMSC 230 determines that the wide field view has an average bitrate of 1 Mbps, the narrow field view has an average bitrate of 1 Mbps, the home goal view has an average bitrate of 0.5 Mbps, the visitors goal view has an average bitrate of 0.5 Mbps, and the player view has an average bitrate of 1.4 Mbps.

As shown by reference number 530, assume that BMSC 230 sums the average bitrates for each of the video streams to calculate a total bandwidth for the master bearer. For example, assume that BMSC 230 determines to allocate 4.4 Mbps of total bandwidth to the master bearer (e.g., 1 Mbps+1 Mbps+0.5 Mbps+0.5 Mbps+1.4 Mbps). As further shown, this total bandwidth of 4.4 Mbps is less than the sum of the peak bitrates of the five video streams, which is equal to 6.0 Mbps (e.g., 1.2 Mbps+1.2 Mbps+1 Mbps+1 Mbps+1.6 Mbps). As shown by reference number 540, assume that BMSC 230 provides instructions, to base station 220, to create a master bearer with a total bandwidth of 4.4 Mbps to carry the five video streams.

As shown in FIG. 5B, and by reference number 550, assume that base station 220 receives each of the five video streams via a separate bearer, labeled Bearer 1 through Bearer 5. As shown by reference number 560, assume that base station 220 multiplexes these five bearers (e.g., the five video streams) to form the master bearer with a guaranteed bitrate (e.g., a total bandwidth) of 4.4 Mbps. As shown by reference number 570, assume that base station 220 broadcasts or multicasts the five video streams, via the master bearer, on a radio channel identified as channel 15. An implementation associated with receiving the video streams via channel 15 and decoding a particular video stream of interest are described below in connection with FIGS. 7A and 7B.

As indicated above, FIGS. 5A and 5B are provided merely as an example. Other examples are possible and may differ from what was described with regard to FIGS. 5A and 5B.

FIG. 6 is a flow chart of an example process 600 for demultiplexing a master bearer and decoding content carried by a bearer included in the master bearer. In some implementations, one or more process blocks of FIG. 6 may be performed by user device 210. In some implementations, one or more process blocks of FIG. 6 may be performed by another device or a group of devices separate from or including user device 210, such as base station 220, BMSC 230, and/or content provider device 240.

As shown in FIG. 6, process 600 may include tuning to a communication channel associated with a master bearer (block 610). For example, user device 210 may tune to a communication channel associated with the master bearer (e.g., based on user input). For example, a user may interact with an application executing on user device 210 to tune to a communication channel that carries broadcast or multicast content, such as a broadcast traffic channel or a multicast traffic channel. The interaction may cause user device 210 to tune to a particular radio frequency via which the master bearer can be received, in some implementations.

As further shown in FIG. 6, process 600 may include providing information that identifies content carried via the master bearer (block 620). For example, user device 210 may tune to the channel associated with the master bearer, and may receive content information carried via the master bearer. The content information may identify content carried via the master bearer, such as information that identifies each content stream multiplexed on the master bearer (e.g., a name of the content stream, information that identifies content carried in the content stream, etc.). User device 210 may provide the content information for display.

As further shown in FIG. 6, process 600 may include receiving a selection of particular content carried via a bearer included in the master bearer (block 630). For example, user device 210 may provide content information for display, and may receive a user selection of particular content selected from the provided content information. In some implementations, a user may interact with user device 210 to provide an indication of particular content, carried via a bearer included in the master bearer, to be decoded and output by user device 210 (e.g., via a display, via a speaker, etc.).

As further shown in FIG. 6, process 600 may include identifying the bearer that carries the particular content (block 640). For example, user device 210 may identify a bearer associated with selected content. In some implementations, the selected content may be associated with a bearer identifier that identifies a bearer that carries the selected content. User device 210 may determine the bearer identifier based on the selected content and/or based on information received via the master bearer (e.g., information that associates a bearer identifier with the selected content).

As further shown in FIG. 6, process 600 may include demultiplexing the master bearer and decoding the particular content (block 650). For example, user device 210 may demultiplex the master bearer to recreate the individual bearers that were multiplexed onto the master bearer by base station 220. User device 210 may determine a particular bearer, that carries content to be decoded, based on the selected content, and may decode the content provided via the particular bearer. For example, user device 210 may provide the particular bearer to an application, executing on user device 210, for decoding. User device 210 may discard the remaining bearers, such that the remaining bearers are not decoded. By only decoding content carried via a bearer of interest, user device 210 may conserve processing resources that would otherwise be required to decode content carried by all of the bearers included in the master bearer. In some implementations, however, user device 210 may decode content carried by all of the bearers.

As further shown in FIG. 6, process 600 may include providing the particular content (block 660). For example, user device 210 may provide the decoded content via an output component, such as a display, a speaker, etc. By multiplexing content onto a master bearer and broadcasting or multicasting the master bearer, base station 220 may permit a user of user device 210 to consume the content while conserving radio resources associated with a radio access network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
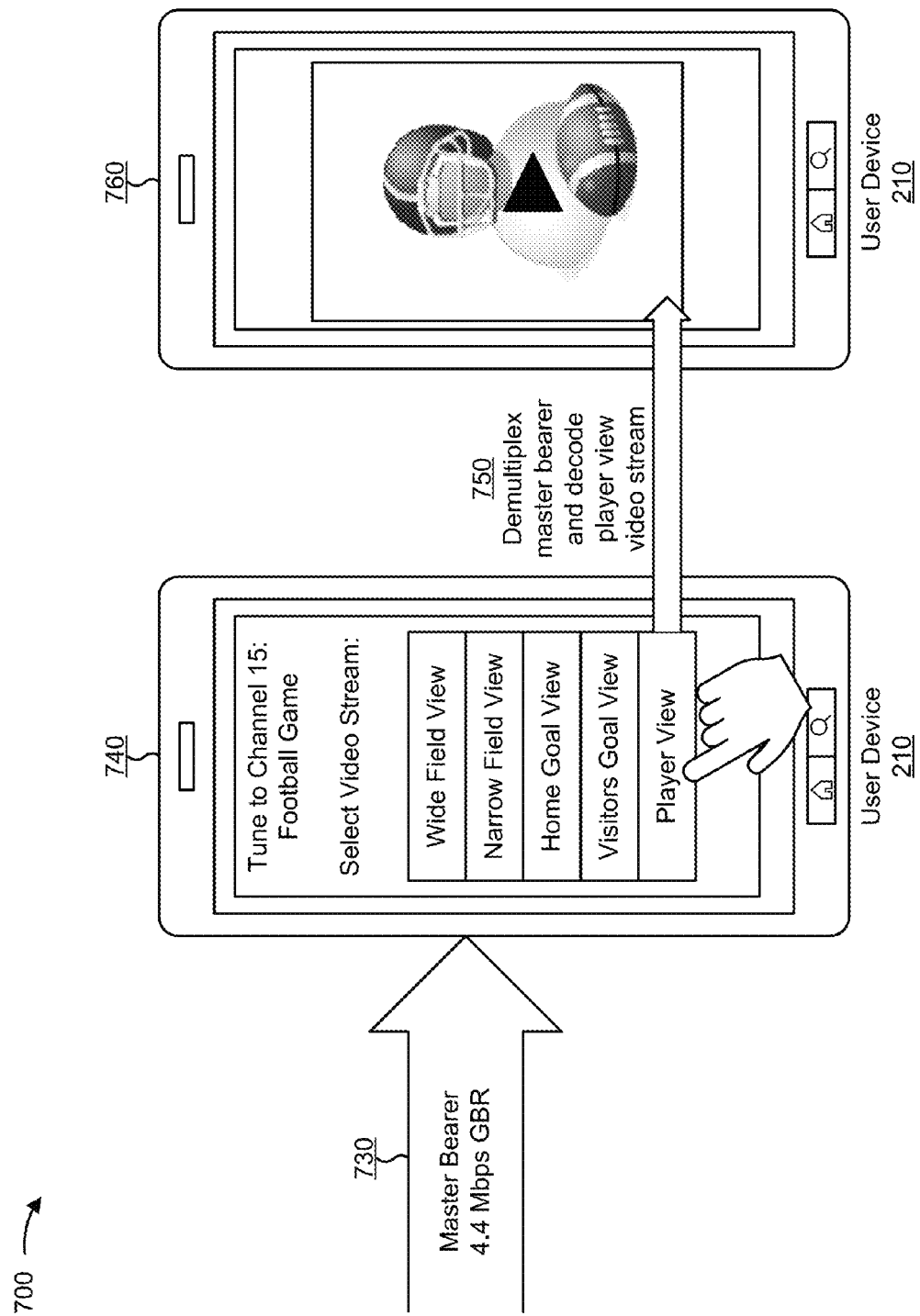

FIGS. 7A and 7B are diagrams of an example implementation 700 relating to example process 600 shown in FIG. 6. FIGS. 7A and 7B show an example of demultiplexing a master bearer and decoding content carried by a bearer included in the master bearer.

As shown in FIG. 7A, and by reference number 710, assume that a user interacts with user device 210 to execute a video streaming application. Assume that the video streaming application is capable of tuning to communication channels that carry broadcast and/or multicast communications. As shown, assume that the video streaming application provides an indication of different channels to which user device 210 can tune. As shown by reference number 720, assume that the user interacts with user device 210 to cause user device 210 to tune to channel 15. Assume that channel 15 is a broadcast or multicast channel associated with a master bearer that carries multiple video streams, as described above in connection with FIGS. 5A and 5B.

As shown in FIG. 7B, and by reference number 730, assume that user device 210 tunes to channel 15 and receives content carried via the 4.4 Mbps master bearer described above. Assume that the master bearer carries content information that identifies different content streams carried via the master bearer. Assume that user device 210 receives the content information, and provides the content information for display to permit the user to identify content to be provided for display. As shown by reference number 740, assume that the content information identifies the five video streams of wide field view, narrow field view, home goal view, visitors goal view, and player view.

As further shown, assume that the user interacts with user device 210 to select a player view video stream. As shown by reference number 750, based on the user selection, assume that user device 210 demultiplexes the content carried via the master bearer, and decodes content associated with the player view video stream. As shown by reference number 760, assume that user device 210 provides the player view video stream for display. In this way, a service provider, associated with a radio access network, may provide content to user device 210 while conserving radio resources associated with the radio access network via use of a master bearer.

As indicated above, FIGS. 7A and 7B are provided merely as an example. Other examples are possible and may differ from what was described with regard to FIGS. 7A and 7B.

Implementations described herein assist in multiplexing multiple bearers to form a master bearer with a bandwidth that is less than the sum of the peak bitrates for each of the multiplexed bearers. In this way, the master bearer may conserve radio resources by more efficiently allocating bandwidth to radio bearers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive bearer information associated with a plurality of radio bearers to be multiplexed to form a master bearer;
      determine a respective bandwidth amount, of a plurality of bandwidth amounts, for each radio bearer, of the plurality of radio bearers, to be allocated to the master bearer,
         each respective bandwidth amount, of the plurality of bandwidth amounts, being less than a corresponding peak bitrate, of a plurality of peak bitrates;
      determine a total bandwidth to be allocated to the master bearer by calculating a sum of the plurality of bandwidth amounts,
         the sum of the plurality of bandwidth amounts being less than a sum of the plurality of peak bitrates;
      form the master bearer, having the total bandwidth, based on multiplexing the plurality of radio bearers; and
      provide a plurality of content streams, associated with the plurality of radio bearers, via the master bearer.

2. The device of claim 1, where the one or more processors, when receiving the bearer information, are to:
   receive bitrate information that identifies a respective average bitrate, of a plurality of average bitrates, associated with each radio bearer, of the plurality of radio bearers; and
   where the one or more processors, when determining the total bandwidth, are to:
      calculate a sum of the plurality of average bitrates.

3. The device of claim 1, where the one or more processors, when receiving the bearer information, are further to:
   receive bitrate information that identifies:
      a respective average bitrate, of a plurality of average bitrates, associated with each radio bearer, of the plurality of radio bearers, and
      the corresponding peak bitrate, of the plurality of peak bitrates, associated with each radio bearer, of the plurality of radio bearers; and
   where the one or more processors, when determining the total bandwidth, are to:
      calculate the sum of the plurality of bandwidths amounts as being between a sum of the plurality of average bitrates and the sum of the plurality of peak bitrates.

4. The device of claim 1, where the one or more processors, when providing the plurality of content streams via the master bearer, are to:
   broadcast or multicast the plurality of content streams via the master bearer.

5. The device of claim 1, where the one or more processors, when determining the total bandwidth, are to:
   determine a quantity of radio bearers included in the plurality of radio bearers; and
   determine the total bandwidth based on the quantity of radio bearers.

6. The device of claim 5, where the one or more processors, when receiving the bearer information, are to:
   receive bitrate information that identifies a respective average bitrate, of a plurality of average bitrates, associated with each radio bearer, of the plurality of radio bearers; and
   where the one or more processors, when determining the total bandwidth based on the quantity of radio bearers, are to:
      determine the total bandwidth, as being closer to a sum of the plurality of average bitrates or closer to the sum of the plurality of peak bitrates, based on the quantity of radio bearers.

7. The device of claim 1, where the one or more processors, when determining the total bandwidth, are to:
   determine a content type of each respective content stream, of the plurality of content streams, associated with the plurality of radio bearers; and
   determine the total bandwidth based on the content type of each respective content stream, of the plurality of content streams, associated with the plurality of radio bearers.

8. A non-transitory computer-readable medium storing instructions, the instructions comprising:
   one or more instructions that, when executed by one or more processors, cause the one or more processors to:
      receive first bitrate information, associated with a first radio bearer, to be multiplexed to form a master bearer;
      receive second bitrate information, associated with a second radio bearer, to be multiplexed with the first radio bearer to form the master bearer;

determine a total bandwidth to be allocated to the master bearer based on the first bitrate information and the second bitrate information,
the total bandwidth being a sum of a plurality of bandwidth amounts,
the sum of the plurality of bandwidth amounts being less than a sum of:
a first peak bitrate, associated with the first radio bearer, and
a second peak bitrate, associated with the second radio bearer;
allocate the total bandwidth to the master bearer;
form the master bearer, having the total bandwidth, by multiplexing the first radio bearer and the second radio bearer; and
provide a first content stream, associated with the first radio bearer, and a second content stream, associated with the second radio bearer, via the master bearer.

9. The non-transitory computer-readable medium of claim 8, where the one or more instructions, when executed by the one or more processors, further cause the one or more processors to:
determine the first peak bitrate and a first average bitrate, associated with the first radio bearer, based on the first bitrate information;
determine the second peak bitrate and a second average bitrate, associated with the second radio bearer, based on the second bitrate information; and
where the one or more instructions, that cause the one or more processors to determine the total bandwidth, cause the one or more processors to:
determine the sum of the plurality of bandwidth amounts based on the first peak bitrate, the first average bitrate, the second peak bitrate, and the second average bitrate.

10. The non-transitory computer-readable medium of claim 8, where the one or more instructions, that cause the one or more processors to determine the total bandwidth, cause the one or more processors to:
determine a first bandwidth as a percentage of the first peak bitrate based on the first bitrate information;
determine a second bandwidth as a percentage of the second peak bitrate based on the second bitrate information; and
determine the sum of the plurality of bandwidth amounts based on the first bandwidth and the second bandwidth.

11. The non-transitory computer-readable medium of claim 8, where the one or more instructions, that cause the one or more processors to determine the total bandwidth, cause the one or more processors to:
determine a first average bitrate, associated with the first radio bearer, based on the first bitrate information;
determine a second average bitrate, associated with the second radio bearer, based on the second bitrate information; and
determine the sum of the plurality of bandwidth amounts based on the first average bitrate and the second average bitrate.

12. The non-transitory computer-readable medium of claim 8, where the one or more instructions, when executed by the one or more processors, further cause the one or more processors to:
determine a bitrate variation associated with the first radio bearer; and
where the one or more instructions, that cause the one or more processors to determine the total bandwidth, cause the one or more processors to:
determine the sum of the plurality of bandwidth amounts based on the bitrate variation.

13. The non-transitory computer-readable medium of claim 8, where the one or more instructions, when executed by the one or more processors, further cause the one or more processors to:
determine a content type of the first content stream associated with the first radio bearer; and
where the one or more instructions, that cause the one or more processors to determine the total bandwidth, cause the one or more processors to:
determine the sum of the plurality of bandwidth amounts based on the content type.

14. The non-transitory computer-readable medium of claim 8, where the one or more instructions, when executed by the one or more processors, further cause the one or more processors to:
determine a first bandwidth amount, associated with the first radio bearer, based on the first bitrate information, the first bandwidth amount being less than the first peak bitrate;
determine a second bandwidth amount, associated with the second radio bearer, based on the second bitrate information,
the second bandwidth amount being less than the second peak bitrate; and
where the one or more instructions, that cause the one or more processors to determine the total bandwidth, cause the one or more processors to:
calculate a sum of the first bandwidth amount and the second bandwidth amount; and
determine the sum of the plurality of bandwidth amounts based on the sum of the first bandwidth amount and the second bandwidth amount.

15. A method, comprising:
receiving, by a device, bitrate information associated with a plurality of radio bearers to be multiplexed to form a master bearer;
determining, by the device, a plurality of bandwidth amounts, of the plurality of radio bearers, based on the bitrate information,
each bandwidth amount, of the plurality of bandwidth amounts, being less than a corresponding peak bitrate of a plurality of peak bitrates associated with the plurality of radio bearers;
determining, by the device, a total bandwidth to be allocated to the master bearer based on the bitrate information,
the total bandwidth being determined by calculating a sum of the plurality of bandwidth amounts,
the sum of the plurality of bandwidth amounts being less than a sum of the plurality of peak bitrates associated with the plurality of radio bearers;
allocating, by the device, the total bandwidth to the master bearer;
forming, by the device, the master bearer based on multiplexing the plurality of radio bearers,
the master bearer having the total bandwidth; and
transmitting, by the device and via the master bearer, a plurality of content streams associated with the plurality of radio bearers.

16. The method of claim 15, where determining the total bandwidth comprises:
determining a network condition associated with the device; and
determining the total bandwidth based on the network condition.

17. The method of claim 15, where the plurality of radio bearers are a first plurality of radio bearers;
where the master bearer is a first master bearer;
where the plurality of content streams are a first plurality of content streams; and
where the method further comprises:
forming a second master bearer based on multiplexing a second plurality of radio bearers,
the second plurality of radio bearers being different from the first plurality of radio bearers, and
the second master bearer being different from the first master bearer; and
transmitting, via the second master bearer, a second respective plurality of content streams associated with the second plurality of radio bearers,
the second plurality of content streams being different from the first plurality of content streams.

18. The method of claim 15, further comprising:
determining a respective average bitrate, of a plurality of average bitrates, associated with each radio bearer of the plurality of radio bearers; and
where determining the total bandwidth comprises:
determining the total bandwidth based on the plurality of average bitrates and the plurality of peak bitrates.

19. The method of claim 15, further comprising:
associating each content stream, of the plurality of content streams, with a respective bearer identifier of a plurality of bearer identifiers; and
where transmitting the plurality of content streams comprises:
transmitting the plurality of bearer identifiers via the master bearer,
the plurality of bearer identifiers permitting a user device to identify and decode a particular content stream, of the plurality of content streams, received by the user device via the master bearer.

20. The method of claim 15, where transmitting the plurality of content streams comprises:
transmitting the plurality of content streams to a user device via a broadcast or multicast channel,
the master bearer permitting the user device to demultiplex the plurality of radio bearers and decode a particular content stream of the plurality of content streams.

* * * * *